W. M. FORCE.
APPARATUS FOR HEATING AND MIXING OLEAGINOUS SEEDS.

No. 176,851.  Patented May 2, 1876.

WITNESSES:  
Chas. Nicla  
John Goethals

INVENTOR:  
W. M. Force  
BY  
ATTORNEYS.

UNITED STATES PATENT OFFICE.

WILLIAM M. FORCE, OF NEWARK, NEW JERSEY.

IMPROVEMENT IN APPARATUS FOR HEATING AND MIXING OLEAGINOUS SEEDS.

Specification forming part of Letters Patent No. 176,851, dated May 2, 1876; application filed March 18, 1876.

*To all whom it may concern:*

Figure 1:
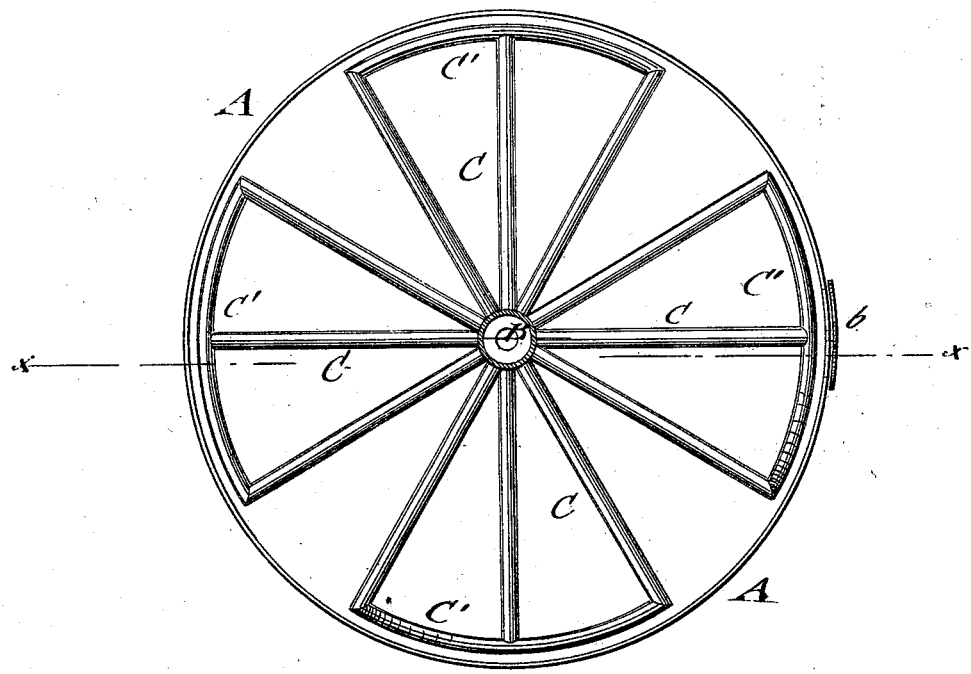
Figure 2:
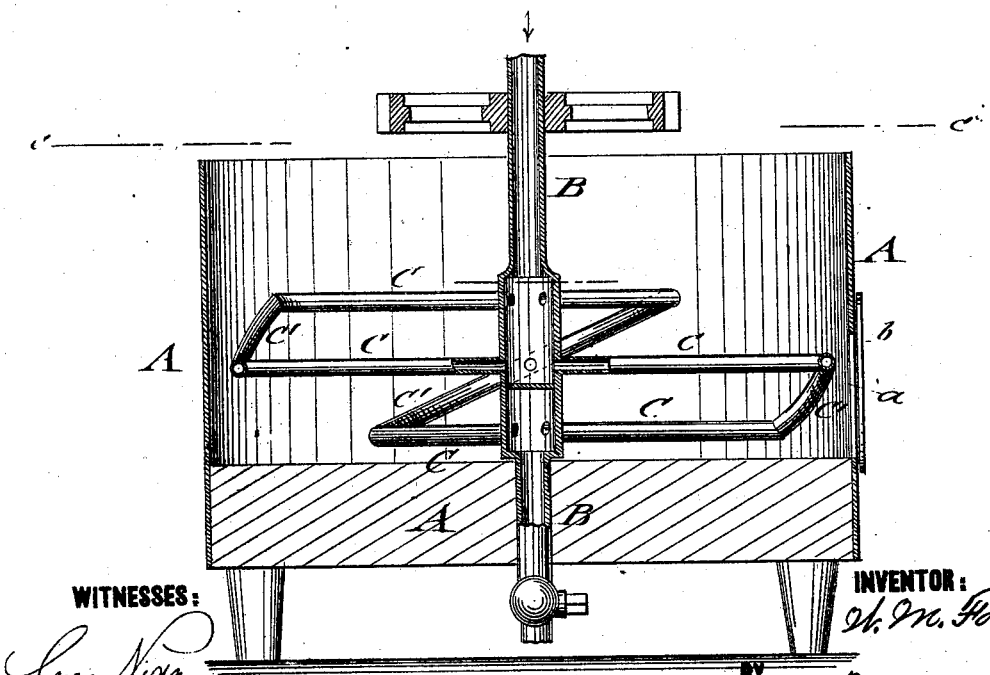

Be it known that I, WILLIAM M. FORCE, of Newark, in the county of Essex and State of New Jersey, have invented a new and Improved Apparatus for Mixing Oleaginous Seeds, of which the following is a specification:

In the accompanying drawing, Figure 1 represents a top view, partly in horizontal section, on line $c\,c$, Fig. 2; and Fig. 2 is a vertical central section on line $x\,x$, Fig. 1, of my improved apparatus for mixing oleaginous seeds.

Similar letters of reference indicate corresponding parts.

The invention relates to an apparatus for mixing oleaginous seeds in a rapid, uniform, and effective manner, so that the seeds, crushed or otherwise, are properly heated, mixed, and tempered for the expression of the oil.

The invention consists of a series of spirally-arranged revolving stirrer-pipes that are supplied with steam from a central upright shaft, or other conductor, to heat and agitate the material.

In the drawing, A represents a cylindrical receptacle of suitable size and material, into which the material to be prepared is placed. A hollow upright shaft, B, is revolved by suitable power centrally to receptacle A, and provided with a number of radial stirrer-pipes, C, that are arranged spirally around shaft B. The outer ends of two or more stirrer-pipes are connected by curved pipe-sections C', that are concentric to shaft B.

The steam enters from the hollow shaft or conductor into the stirrers, and is carried off, after having circulated in the same, at the end of the shaft opposite to the point of entrance.

The spiral stirrers keep the seeds continually in agitation, and produce, under suitable admission of steam or moisture, the thorough heating, mixing, and tempering of the meal in a rapid and uniform manner.

An aperture, $a$, of the receptacle is closed by a pivoted cover, $b$, and opened when the seeds have the required degree of heat and moisture, the seeds being thrown out by centrifugal power when in the most favorable condition for the press.

The apparatus may also be employed with advantage to the drying of cotton-seed preparatory for transportation.

Having thus described my invention, I claim as new and desire to secure by Letters Patent—

An apparatus for mixing oleaginous seeds, composed of a receptacle with a centrally-revolving hollow shaft, provided with spirally-arranged stirrer-pipes, connected at the outer ends by curved pipe-sections, to admit circulation of steam for the proper heating, mixing, and tempering of the seeds, substantially in the manner and for the purpose set forth.

WILLIAM M. FORCE.

Witnesses:
PAUL GOEPEL,
T. B. MOSHER.